United States Patent [19]

Frost

[11] Patent Number: 5,593,182

[45] Date of Patent: Jan. 14, 1997

[54] ENERGY ABSORBENT INTERIOR TRIM FOR VEHICLE

[75] Inventor: Colin Frost, Dover, N.H.

[73] Assignee: Davidson Textron Inc., Dover, N.H.

[21] Appl. No.: 523,038

[22] Filed: Sep. 1, 1995

[51] Int. Cl.⁶ .................................................. B60R 21/04
[52] U.S. Cl. ................................ 280/751; 296/189
[58] Field of Search ............................ 200/751; 296/189

[56] References Cited

U.S. PATENT DOCUMENTS

| 3,539,201 | 11/1970 | Loew ............................ 280/751 |
| 3,779,595 | 12/1973 | Suzuki et al. .................. 296/28 |
| 3,797,857 | 3/1974 | Reeves ......................... 280/751 |
| 3,904,223 | 9/1975 | Wilfert et al. .................. 280/751 |
| 5,163,730 | 11/1992 | Welch .......................... 296/189 |
| 5,306,066 | 4/1994 | Satthoff ........................ 280/751 |
| 5,356,177 | 10/1994 | Weller ......................... 280/751 |
| 5,433,478 | 7/1995 | Naruse ......................... 280/751 |

Primary Examiner—Kenneth R. Rice
Attorney, Agent, or Firm—Reising, Ethington, Barnard & Perry

[57] ABSTRACT

A trim assembly for a vehicle providing energy absorption between a body member and a trim cover and a plurality of energy absorbing pins therebetween that are either permanently plastically deformed upon the cover initially being impacted or that are elastically deformed to absorb kinetic energy as the cover is impacted.

16 Claims, 2 Drawing Sheets

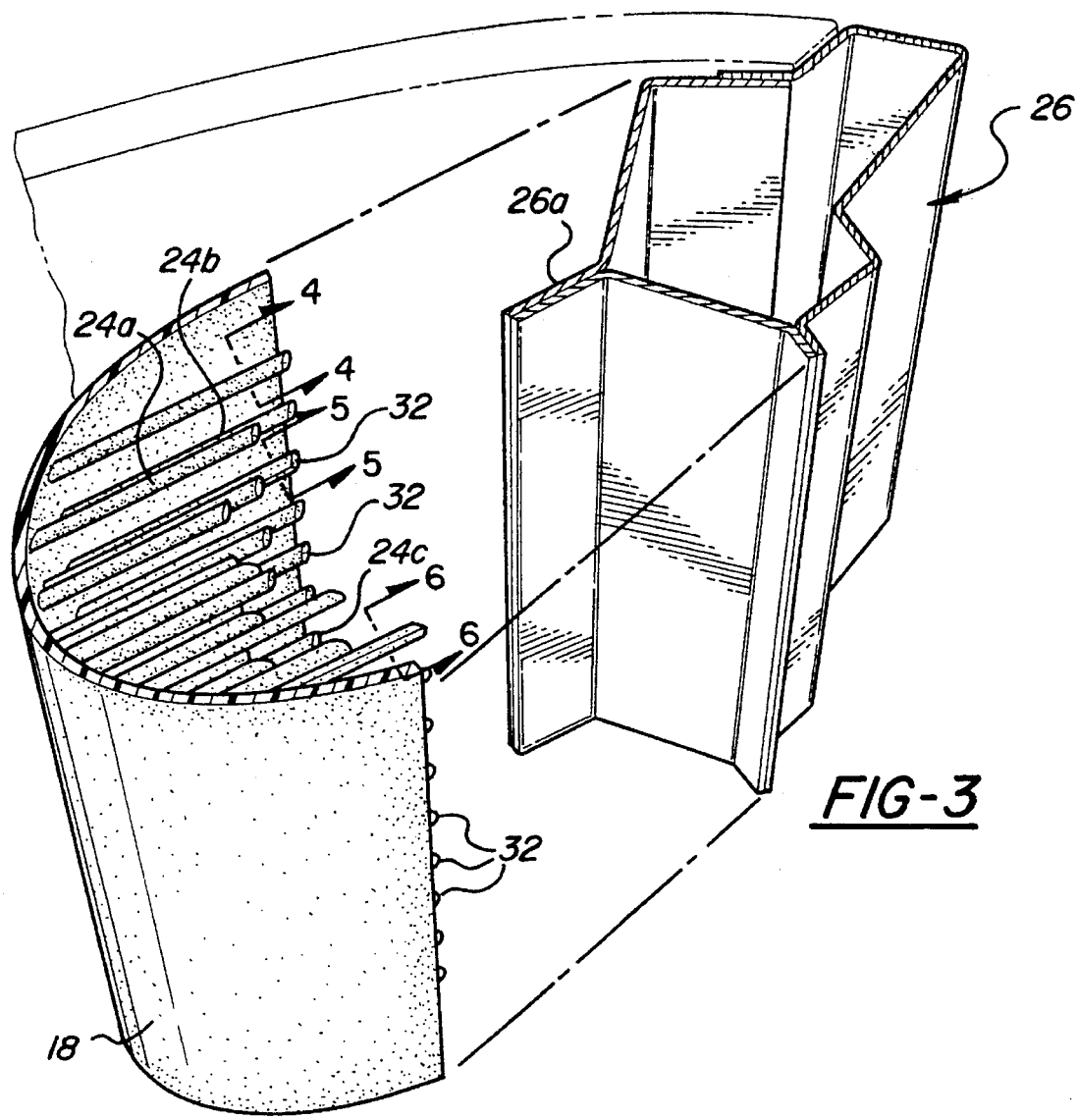
FIG-3
FIG-4
FIG-5
FIG-6
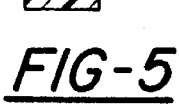
FIG-7

ENERGY ABSORBENT INTERIOR TRIM FOR VEHICLE

TECHNICAL FIELD

This invention relates to trim assembly for a vehicle providing energy absorption between a body member and a trim cover and more particularly to such trim assemblies for covering vehicle pillars or trim bars.

BACKGROUND OF THE INVENTION

Presently, interior trim molding used to cover most frame components of a vehicle, such as the fore and aft pillar posts, are made of hard injection molded plastic materials that define a decorative cover but do not respond to impact loading so as to absorb energy. Future Federal Safety Regulations are expected to require that such trim moldings be configured to absorb energy on impact to offer better impact protection to the occupants of the vehicle in the event of an accident.

Pillar post, side rails and other like parts of a vehicle body are covered at the present time by polymeric injection molded parts that can be covered by decorative skins including fabrics. While such arrangements have an aesthetic appeal they do not provide controlled energy absorption of kinetic energy through energy absorption.

One proposal for such energy absorption is set-forth in U.S. Pat. No. 5,163,730 that includes a cover, a pillar and an interposed bracket that will buckle and deform to absorb kinetic energy. The arrangement requires the assembly of separate fasteners to connect an elastically deformable side portion of the bracket to a body member.

Another trim cover is shown in U.S. Pat. No. 3,797,857 that discloses a multipiece trim strip with a molded PVC channel and a strip metal reinforcement that is attached to flanges of a windshield pillar or to a side rail. The trim strip is disclosed in embodiments of FIGS. 3 and 4 as having a resilient plastic pad located on the interior surface of the trim arrangement.

U.S. Pat. No. 3,779,595 discloses a cover arrangement for a center pillar or quarter pillar of a vehicle body having inner and outer channel members forming the pillar. The pillar is covered by a trim panel that includes a substrate that is connected to the inner channel member by plastically deformable support arms or a shock absorber plate.

While suitable for their intended purpose the prior art arrangements do not provide structure that includes integral portions thereon that are easily connected to vehicle body members without the need for separate fasteners thereby to provide ease of assembly and precise location of an energy absorbing arrangement prior to installation of a decorative cover member; further, none of the prior art arrangements provide the ability to control or tune the level of energy absorption for a given application.

SUMMARY OF THE INVENTION AND ADVANTAGES

The present invention addresses the problem of connection of a energy absorbing component in a trim component assembly having a body member and a separate decorative cover member such that the energy absorbing component includes integral portions that eliminate the need for separate fasteners to secure it in place prior to installation of the outer decorative cover while providing either plastic and/or elastic energy absorption.

An object of the present invention is to provide a trim assembly for a vehicle providing energy absorption between a body member and a trim cover and a plastically and/or elastically deformable structure that will absorb energy by buckling or elastic deformation as the cover is impacted in which the energy absorption is provided by a plurality of columnar elements interposed between the cover and the body member each of which will break, buckle or bend when the trim cover is impacted so as to absorb energy by either plastic or elastic deformation.

A further feature of the present invention is to provide the aforesaid trim assembly for a vehicle providing energy absorption between a body member and a trim cover that has columnar elements integrally molded with the cover and dimensioned to form variable rates of energy absorbing at spaced points between the trim cover and the body member.

A still further feature of the invention is to provide the aforesaid trim assembly for a vehicle providing energy absorption between a body member and a trim cover wherein the columnar elements are connected to the trim cover during a second stage injection of material.

A still further feature of the invention is to provide the aforesaid trim assembly for a vehicle providing energy absorption between a body member and a trim cover wherein the columnar elements are of uniform cross-section.

Yet another feature of the invention is to provide the aforesaid trim assembly for a vehicle providing energy absorption between a body member and a trim cover wherein the columnar elements are of circular cross-section.

Still another feature is to provide such a trim assembly wherein the columnar elements are of polygonal cross-section.

Still another feature is to provide such a trim assembly wherein the columnar elements are connected to the trim cover and include a free end engageable with the body member.

Still another feature of the present invention is to provide the columnar elements in such trim assemblies with different cross-sectional areas.

Yet another object of the present invention is to provide such trim assemblies that include a matrix having different columnar densities at different parts of the matrix.

Yet another object of the present invention is to provide such trim assemblies wherein the columnar elements are made formed as a matrix having and the columnar elements are formed from different materials at different parts of the matrix.

Still another object of the present invention is to provide such a trim assembly wherein the columnar elements form a matrix having different sized columnar elements at different parts of the matrix.

THE DRAWINGS

Presently preferred embodiments of the present invention are disclosed in the following description and the accompanying drawings, wherein:

FIG. 3 is an exploded, partly broken, perspective view of the trim assembly shown in FIG. 2;

FIG. 4 is an enlarged cross-sectional view taken along the line 4—4 of FIG. 3;

FIG. 5 is an enlarged cross-sectional view taken along the line 5—5 of FIG. 3;

FIG. 6 is an enlarged cross-sectional view taken along the line 6—6 of FIG. 3; and FIG. 7 is a diagrammatic view of a fragment of a pin or tab array having a variable pin/tab density.

DETAILED DESCRIPTION

Figure 1:
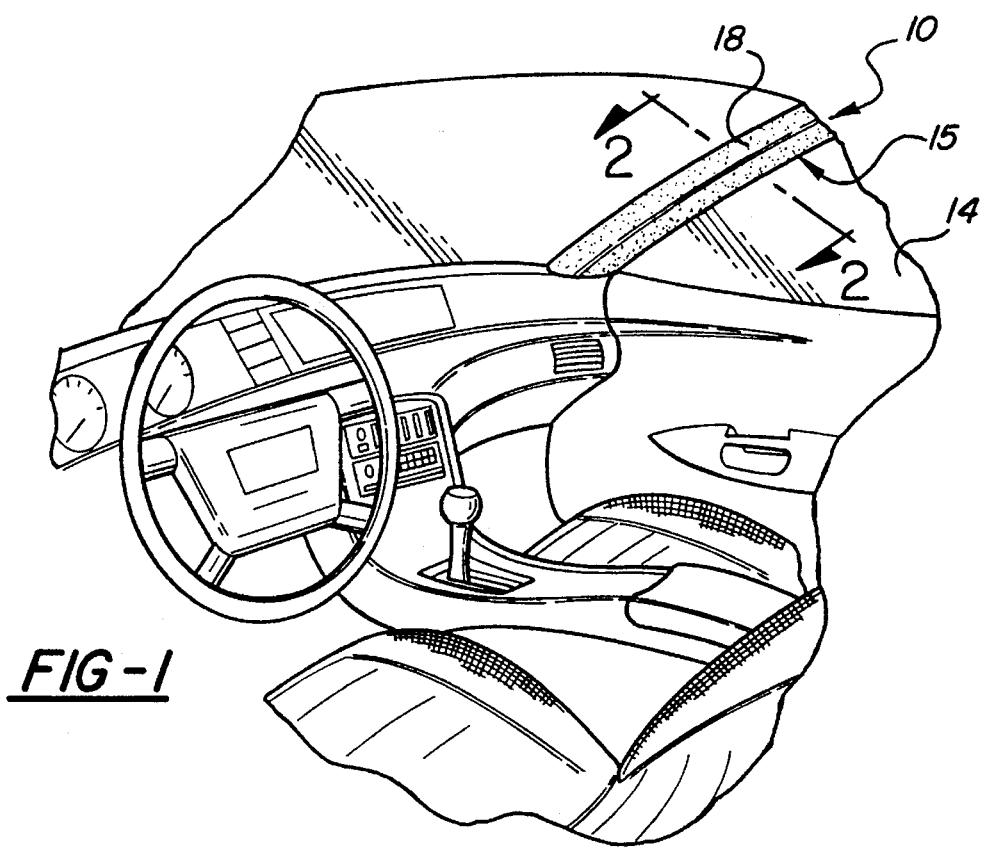
FIG. 1 is a fragmentary perspective view of a passenger compartment of an automotive vehicle showing a trim assembly of the present invention covering a front pillar post.

FIG. 1 illustrates a passenger compartment of an automotive vehicle 10 in which a frame 12 of the vehicle is shown extending about an adjacent window 14 and including a trim assembly 15 constructed according to the present invention.

In the illustrated arrangement the trim assembly 15 is associated with the upright front or A pillar 16 of the vehicle with it being understood that the invention is suitable for side rail components of the interior trim of a vehicle including but not limited to the window frame components and the upright back of B pillar portion of the frame and interconnecting roof structure rails that extend between the upper ends of the A and B pillar portions all of which components are well known to those skilled in the art as including structural sections that will provide desired support and rigidity to the body sections of a motor vehicle.

In the illustrated embodiment the trim assembly 15 has the same general shape and configuration as the front A pillar 16 on which it is mounted and in the illustrated embodiment the trim assembly 15 includes a decorative trim cover 18 that is associated with an energy absorbing arrangement 20 that can be either molded integrally of or adhesively connected to the inner surface 22 of the cover 18 in a manner to be described. In accordance with one principle of the present invention, the energy absorbing arrangement 20 includes a plurality of columnar elements formed as pins or tabs 24 that can be frictionally fit or snap fit on a body member 26.

Figure 2:
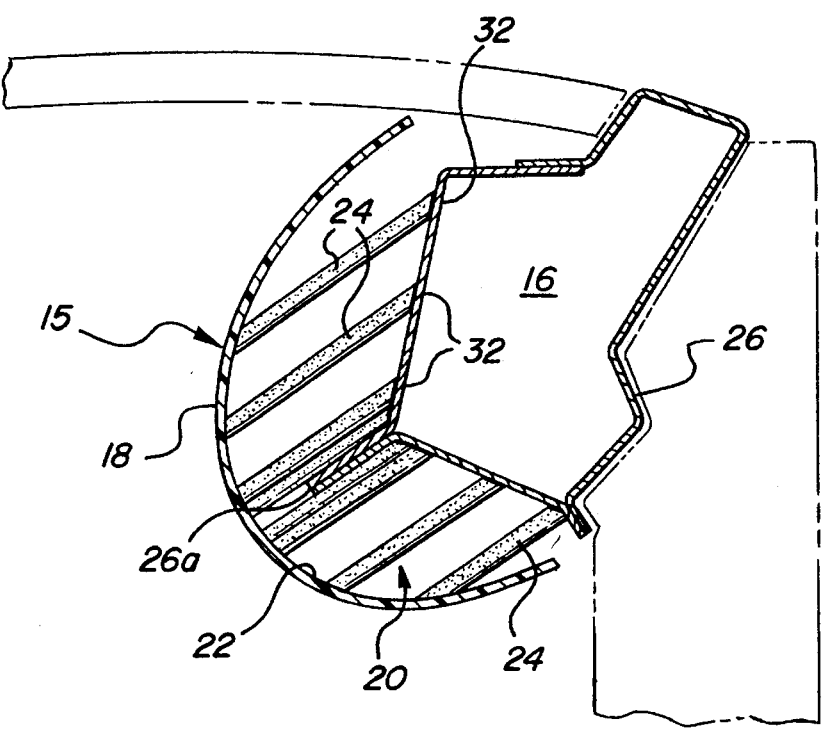
FIG. 2 is an enlarged sectional view taken along the line 2—2 of FIG. 1 looking in the direction of the arrows.

Specifically, in the embodiment of FIGS. 2 and 3, the energy absorbing arrangement 20 includes pins or tabs 24 that have a base portion 28 that is integrally formed with and that extends generally inwardly of the inner surface of a curved segment 30 of the cover 18. The curved segment 30 of the cover can be formed integrally of the energy absorbing arrangement 20 or can be connected thereto by a secondary injection step following injection molding of the cover 18. The energy absorbing arrangement 20 can include pins or tabs of various shapes and cross-sections. For illustrative purposes, in the energy absorbing arrangement 20 of FIGS. 2 and 3, certain of the pins or tabs have a circular cross-section that is uniform all their length as shown in the cross-sectional view of FIG. 4. Others of the pins or tabs have a generally rectangular cross-section as shown in FIG. 5. Still others can have a polygonal shape such as a triangular cross-section as shown in FIG. 6. In the illustrated arrangement the pins or tabs 24 have a uniform cross-section along their length but can have a section that increases in cross-section uniformly along the length of the pins or tabs as shown at pin or tab 24a; or can be varied along the length as shown at pin or tab 24b; or can be of different length as shown at pin or tab 24c.

The resultant array can be comprised of the same kind of plurality of columnar elements 24 interposed between the cover 18 and the body member 26 each of which will break or bend when the trim cover is impacted so as to absorb energy by either plastic or elastic deformation.

The pins or tabs 24 comprising the columnar elements 24a–24c can be integrally molded with the cover 18 and dimensioned to form variable rates of energy absorbing at spaced points between the trim cover 18 and the body member 26. While the columnar elements or pins and tabs 24 can be connected to the trim cover by integrally forming during initial injection of material they can also be formed during a second stage injection of material.

The pins or tabs 24 are spaced to fit on a part 26a or the body member 26. They also have a free end 32 engageable with the body member and further can include a matrix having different materials in the columnar elements at different parts of the matrix. Alternatively, the matrix of pins or tabs 24 making up the energy absorbing arrangement 20 can have different columnar densities at different parts of the matrix at shown diagrammatically in FIG. 7 at 34.

The materials used in the cover and matrix will depend upon a particular application. However, in many cases the cover can be formed of a suitable injection molded thermoplastic material such as thermoplastic urethane of thermoplastic polyvinyl chloride or alloys of same. If the pins or tabs are formed as a second stage injection other thermoplastic materials can be used than those forming the cover. Alternatively, thermosetting materials such as ABS or polycarbonates can be used for the pins depending upon the kind of energy absorption that is desired, e.g., fracture or bending in the elastomeric range.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. It is therefore to be understood that within the scope of the appended claims, the invention may be practiced otherwise than as specifically shown and described.

What is claimed is:

1. A trim assembly for a vehicle providing energy absorption between a body member and a trim cover and a cover having a generally curvilinear configuration with opposite ends thereon and including a curved inner surface and an energy absorbing arrangement having an undeformed position and a deformed position that is plastically buckled upon the cover being impacted and the energy absorbing arrangement having a first segment thereon engaged with the curved inner surface of the cover and a second segment engaged with the body member to form an plastically and/or elastically deformable structure that will absorb energy by buckling or elastic deformation as the cover is impacted characterized by:

a plurality of columnar elements interposed between the cover and the body member each of which will break or bend when the trim cover is impacted so as to absorb energy by either plastic or elastic deformation.

2. A trim assembly for a vehicle providing energy absorption between a body member and a trim cover as set-forth in claim 1 further comprising:

the columnar elements being integrally molded with the cover and dimensioned to form variable rates of energy absorbing at spaced points between the trim cover and the body member.

3. A trim assembly for a vehicle providing energy absorption between a body member and a trim cover as set-forth in claim 1 wherein the columnar elements are connected to the trim cover during a second stage injection of material.

4. A trim assembly for a vehicle providing energy absorption between a body member and a trim cover as set-forth in claim 1 wherein the columnar elements are of uniform cross-section.

5. A trim assembly for a vehicle providing energy absorption between a body member and a trim cover as set-forth in claim 4 wherein the columnar elements are of circular cross-section.

6. A trim assembly for a vehicle providing energy absorption between a body member and a trim cover as set-forth in claim 1 wherein the columnar elements are of polygonal cross-section.

7. A trim assembly for a vehicle providing energy absorption between a body member and a trim cover as set-forth in claim 4 wherein the columnar elements are connected to the trim cover and include a free end engageable with the body member.

8. A trim assembly for a vehicle providing energy absorption between a body member and a trim cover as set-forth in claim 5 wherein the columnar elements are connected to the trim cover and include a free end engageable with the body member.

9. A trim assembly for a vehicle providing energy absorption between a body member and a trim cover as set-forth in claim 6 wherein the columnar elements are connected to the trim cover and include a free end engageable with the body member.

10. A trim assembly for a vehicle providing energy absorption between a body member and a trim cover as set-forth in claim 1 wherein the columnar elements are connected to the trim cover and include a free end engageable with the body member and further include different cross-sectional areas.

11. A trim assembly for a vehicle providing energy absorption between a body member and a trim cover as set-forth in claim 1 wherein the columnar elements are connected to the trim cover and include a free end engageable with the body member and further include a matrix having different columnar densities at different parts of the matrix.

12. A trim assembly for a vehicle providing energy absorption between a body member and a trim cover as set-forth in claim 1 wherein the columnar elements are connected to the trim cover and include a free end engageable with the body member and further include a matrix having different materials in the columnar elements at different parts of the matrix.

13. A trim assembly for a vehicle providing energy absorption between a body member and a trim cover as set-forth in claim 1 wherein the columnar elements are connected to the trim cover and include a free end engageable with the body member and further include a matrix having different sized columnar elements at different parts of the matrix.

14. A trim assembly for a vehicle providing energy absorption between a body member and a trim cover as set-forth in claim 13 wherein the columnar elements include different cross-sectional areas.

15. A trim assembly for a vehicle providing energy absorption between a body member and a trim cover as set-forth in claim 13 wherein the columnar elements have different columnar densities at different parts of the matrix.

16. A trim assembly for a vehicle providing energy absorption between a body member and a trim cover as set-forth in claim 13 wherein the columnar elements have different materials in the columnar elements at different parts of the matrix.

* * * * *